INVENTOR
EDGARDO J. PARSI
BY Norman E. Saliba
ATTORNEY

INVENTOR
EDGARDO J. PARSI
BY Norman E. Saliba
ATTORNEY

United States Patent Office 3,645,882
Patented Feb. 29, 1972

3,645,882
CARBONATION PROCESS FOR SO₂ REMOVAL
Edgardo J. Parsi, Watertown, Mass., assignor to Ionics, Incorporated, Watertown, Mass.
Division of application Ser. No. 795,921, Feb. 3, 1969, now Patent No. 3,515,513, which is a continuation-in-part of application Ser. No. 704,284, Feb. 9, 1968, now Patent No. 3,524,801, which in turn is a continuation-in-part of application Ser. No. 693,903, Dec. 27, 1967, now Patent No. 3,523,880. This application Apr. 1, 1970, Ser. No. 31,459
Int. Cl. B01d 13/02
U.S. Cl. 204—301
4 Claims

ABSTRACT OF THE DISCLOSURE

This invention is directed to increasing the current efficiency of the cation exchange membrane located next to the cathode in a three chamber cell for the electrolytic conversion of an alkali metal sulfate for use in the removal and recovery of sulfur dioxide contaminants from flue gases. After the removal of said sulfur dioxide contaminant from flue gas, carbon dioxide is introduced into the cell's catholyte solution by contacting catholyte solution with at least a portion of the said treated flue gas at any point in the catholyte system, preferably by recycling the catholyte solution between the cell's cathode compartment and a carbonation tower.

---

Figure 1:
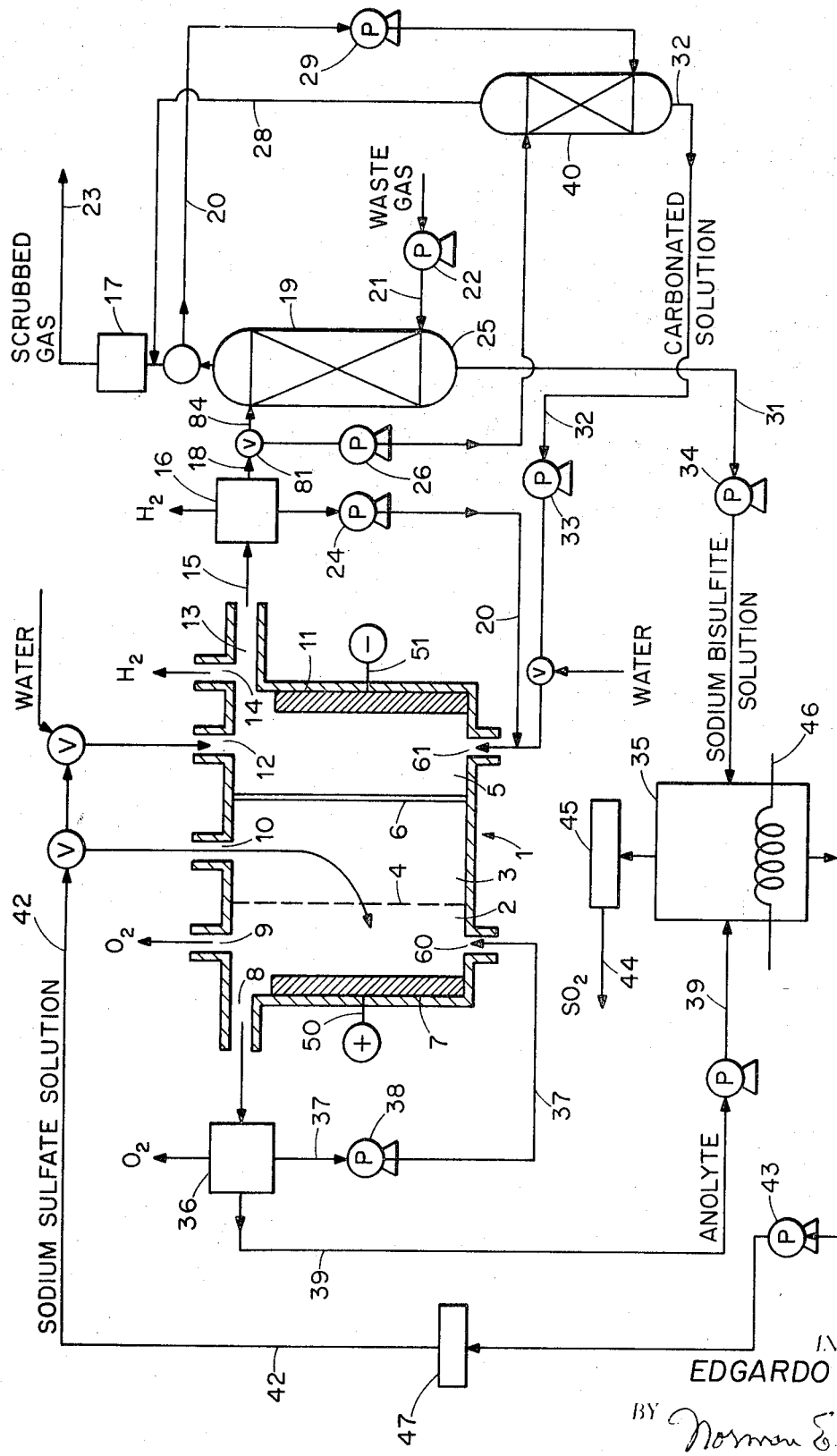

This application is a division of Ser. No. 795,921 filed Feb. 3, 1969, now U.S. Pat. No. 3,515,513

This applicaton is a continuation-in-part of copending application, Ser. No. 704,284 filed Feb. 9, 1968, now Pat. No. 3,524,801, entitled "Process for Producing Sulfuric Acid From SO₂ Containing Waste Gas" which in turn is a continuation-in-part of Ser. No. 693,903 filed Dec. 27, 1967, now Pat. No. 3,523,880 entitled "Electrolytic Cell for Removal and Recovery of SO₂ From Waste Gases."

This invention relates to the method and apparatus for increasing the current efficiency of the cation selective membranes defining the cathode compartments in three chamber electrolytic cells. These cells are used for the conversion of alkali metal sulfate to alkali metal hydroxide and alkali metal bisulfate which is employed for the removal and recovery of sulfur dioxide from flue or stack gases. More specifically, it relates to the absorption of carbon dioxide from flue or stack gases, after the substantial removal of the sulfur dioxide content by absorption of the SO₂ into the alkali metal hydroxide solution formed in the catholyte compartment of said electrolytic cell.

In copending applications Ser. No. 625,149 filed Mar. 22, 1967, now Pat. No. 3,475,122 and No. 717,766 filed Apr. 1, 1968, now Pat. No. 3,523,755, there are disclosed, inter alia, three compartment electrolytic salt conversion cells which are employed for removing sulfur dioxide from flue and stack gases containing minor amounts of sulfur dioxide which, besides avoiding the pollution of the atmosphere, yields with subsequent recovery the sulfur dioxide for eventual conversion into commercially valuable byproducts. The main components of such three compartment electrolytic cells are arranged in the order of an anode, an anode compartment, a porous diaphragm, a center compartment, a cation-transfer membrane, a cathode compartment and a cathode. Liquid flow-directing spacers provide the compartments and also provide the required gasketing and separation of the components. A hydraulically non-porous cation-transfer membrane is used so that the liquid flowing through the cathode compartment can be independently controlled. The non-porous cation membrane prevents physical mixing of the catholyte and center compartment streams, making it easy to control the concentration of caustic generated in the catholyte. Essentially, only base-forming cations (and electroosmotic water) from the center compartment pass through the cation membrane to balance the hydroxyl ions produced at the cathode. The center compartment food stream leaves the center compartment only by passing through the porous diaphragm into the adjacent anode compartment. This constant hydraulic flow through the diaphragm aids in preventing the hydrogen ions produced at the anode from competing with the base cations migrating across the cation-transfer membrane into the cathode compartment. The salt feed stream which enters the center compartment must leave the cell from the anode compartment along with any acid or acid salt produced by the anodic reaction.

The basic common concepts disclosed in the prior art as noted above, are cyclic liquid phase absorption processes comprised of four steps. The first step employs a three compartment electrolytic cell (or multi three compartment cell apparatus) for converting the center compartment feed solution of a sulfate salt into an alkaline catholyte solution and an anolyte solution of sulfuric acid and/or acid sulfate salt. The second step involves the use of a contactor or scrubber for removal of sulfur dioxide from a gas stream mixture by absorption of sulfur dioxide into the catholytic alkaline solution to form predominantly a bisulfite solution. The third step is directed to neutralizing this laden alkali (bisulfite solution) with the acidic effluent anolyte solution to reform the original sulfate salt. The desorbed sulfur dioxide gas resulting from the neutralization is stripped off as by reboiling of the neutralized solution and thereafter recovered as a concentrated gas stream. In the fourth step the reformed sulfate salt solution is recycled as feed solution to the electrolytic cells where it is once again converted into acidic and alkaline components.

In this prior art procedure for the electrolytic conversion of alkali metal sulfate to alkali metal hydroxide and alkali metal bisulfate the current efficiency for hydroxide production is decreased due to the high mobility of the hydroxide ion through the cation membrane of the cell. The migration of OH⁻ from the cathode compartment through the cation membrane and into the center compartment reduces the current efficiency for alkali metal hydroxide production. The degree of reduction of current efficiency increases with increasing caustic concentration in the cathode compartment of the electrolytic cell thus limiting the economic concentration of caustic that can be produced for absorbing sulfur dioxide from flue or stack gases. For this reason sulfonated cross-linked polystyrene type membranes such as those commercially known as Ionics CR 61 (described in U.S. Pat. No. 2,731,411) were found inefficient for this purpose so that up to the time of the present invention it was necessary to employ special carboxylic type membranes known commercially as Ionics CR 70 (described in U.S. Pat. No. 2,731,408) to obtain a more efficient electrolytic conversion.

Under the principles indicated above it was found that an improved current efficiency for the electrolytic conversion in the three chamber cell referred to above is effected when the catholyte solution is essentially an alkali metal carbonate, bicarbonate, or a mixture thereof. Since the carbonate and bicarbonate ions have a slower mobility than the hydroxide ion the current efficiency for making caustic (in conjunction with carbonate or bicarbonate) is increased significantly over the prior art methods. This result can be effected by introducing into the catholyte solution carbon dioxide preferably obtained from the stack gas after the sulfur dioxide content has been substantially removed therefrom. Since any remaining sulfur dioxide in the treated stack gas is comparatively small compared to the carbon dioxide content of said gas, the presence of this sulfur dioxide does not detract from the desired result obtained by this present invention. Accordingly, carbon dioxide can be absorbed into the catholyte by contacting the catholyte solution with the treated stack gas at any point in the catholyte system but preferably by recycling the catholyte solution between the cathode compartment and the carbonation tower. In addition the carbonation step could very well take place in the sulfur dioxide absorber itself as referred to hereinafter in more detail.

It is therefore an object of the present invention to provide a process for a more efficient electrolytic conversion of an alkali metal sulfate to alkali metal hydroxide in the cell of the present disclosure.

Another object is to provide a cyclic process for a more efficient conversion of alkali metal sulfate to alkali metal bisulfate.

Another object of this invention is to provide a continuous process for an improved cyclic electrolytic system whereby the liquid absorption of gaseous carbon dioxide into the catholyte solution at any desired point in the catholyte flow system is effected.

Another object is to effect an improved, efficient electrolytic conversion of alkali metal sulfate to alkali metal bisulfate employing sulfonated cross-linked polystyrene type cation selective membranes in the three chamber cells described herein.

Various other objects and advantages will be apparent to one skilled in the art upon reading the following disclosure and the novel features will be particularly pointed out hereinafter in connection with the appended claims. It is understood that the details may be modified without departure from the principles of the invention which is readily understood when taken in connection with the accompanying drawing. For the purpose of simplicity the various valves, flowmeters, pressure gauges, pumps, switches, etc. which one skilled in the art might employ are not all fully illustrated in the drawing which is a diagrammatic representation of a simple absorption and regeneration system.

In general the present invention comprises a continuous self-generating liquid-phase sulfur dioxide absorption system employing a novel combination of five basic steps for controlled gas purification and for the economic and efficient recovery of a concentrated stream of sulfur dioxide from the system. The first step of a preferred embodiment involves the electrolytic conversion of ammonium, magnesium or alkali metal sulfate salt (preferred to hereinafter as a sulfate salt) into its acidic and alkaline components in a single or preferably a multiple three chamber electrolytic coil system. The second step involves passing into the upper section of a contactor (termed a sulfur dioxide absorption tower or scrubber) at least a portion of the catholyte solution effluent produced in the cathode chamber of the cell while the remaining portion is passed to the upper section of a carbonation tower and simultaneously therewith a waste gas containing the sulfur dioxide contaminant is passed into the lower section of the sulfur dioxide scrubber. In the third step at least part of the substantially free $SO_2$ effluent gas (containing $CO_2$) from the upper section of the sulfur dioxide scrubber is passed into the bottom of the carbonation tower. The resulting effluent gas from the carbonation tower is combined with the effluent gas from the sulfur dioxide scrubber and passed out to the atmosphere as an inoffensive flue or stack gas substantially free of $SO_2$. A fourth step involves the recycling of the liquid effluent from the bottom of the carbonation tower (which comprises a liquid mixture mostly of sodium carbonate, and/or sodium bicarbonate with some unreacted sodium hydroxide) to the cathode chamber as a feed solution with the addition of a liquid make-up such as sodium sulfate solution or water when found necessary. The fifth step removes the bisulfite salt solution from the bottom section of the sulfur dioxide scrubber which solution is then directed to a sulfur dioxide stripper (or neutralizer tank) where it is combined with the acidic effluent from the anode chamber for release and recovery of the absorbed sulfur dioxide gas. A sodium sulfate residual solution is obtained for return as a feed salt solution to the center compartment, and when found necessary as a make-up solution to the cathode chamber of the electrolytic cell.

The process for carrying out the invention will now be described by reference to the apparatus shown schematically in the drawings and in particular to the employment of a substantially sodium carbonate and/or bicarbonate salt as the main recycle feed solution to the cathode chamber of the three chamber cell employed in the cyclic systems of the present invention.

Figure 2:
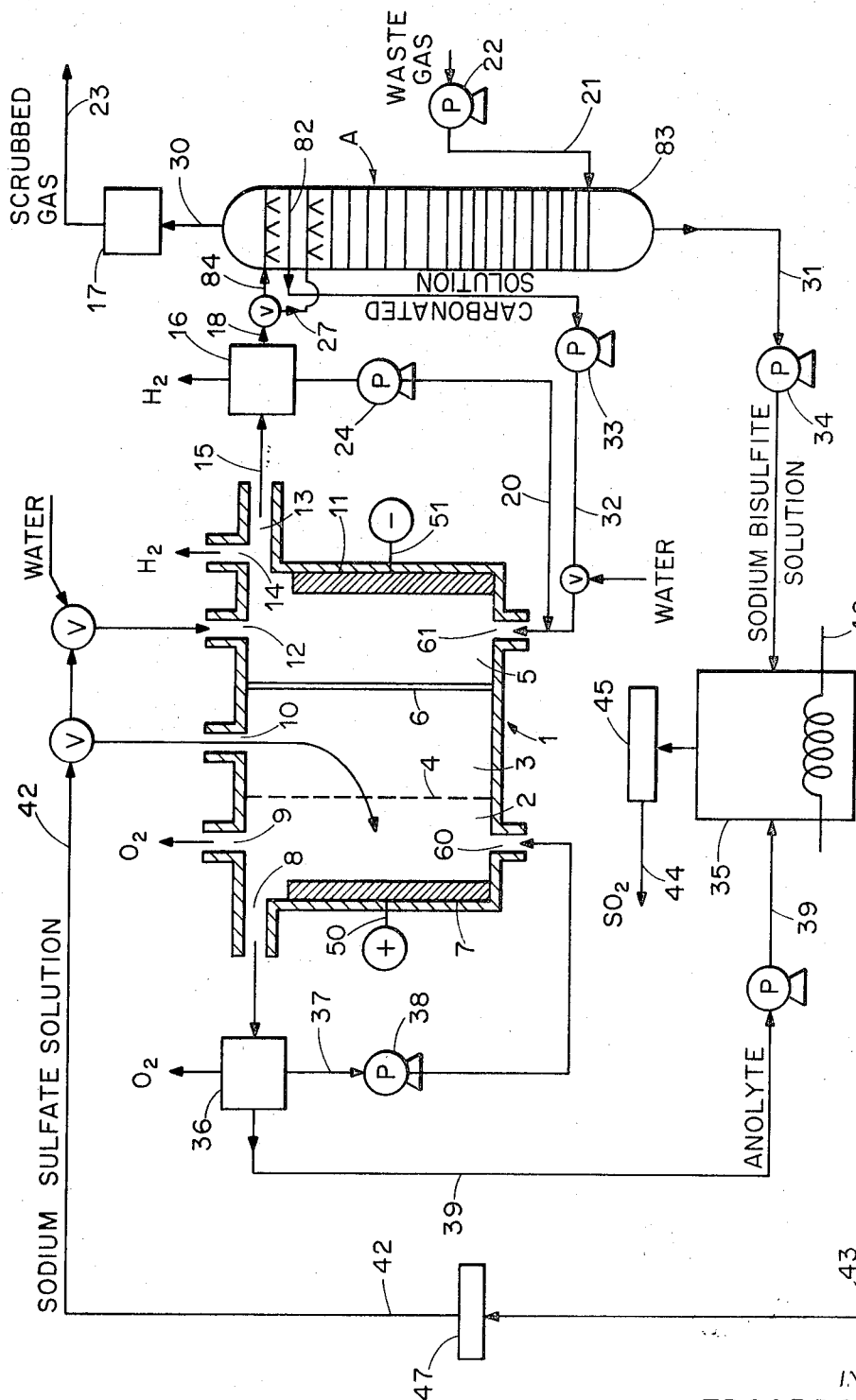

FIG. 1 is a diagrammatic schematic drawing or flow sheet of the novel system of the present invention employing separate $SO_2$ scrubber and carbonation towers and FIG. 2 is a modification of the system of FIG. 1 whereby the carbonation tower is combined with the absorber tower.

In the practice of this invention with particular reference to the system of FIG. 1 in its steady state operation, a substantially neutral feed solution of for example, sodium sulfate is passed from line 42 by pump 43 into the center compartment 3 of electrolytic cell 1 and a sodium carbonate and/or bicarbonate solution is passed into the cathode chamber or compartment 5 through inlet 61. By means of a source of direct current impressed across the cell through leads 50 and 51 (source not shown) the sulfate feed solution is split, resulting in the formation of primarily an acid sulfate solution in the anode chamber 2 and a metal hydroxide solution in the cathode chamber 5. The electrolytic cell is preferably of the type previously described having three compartments wherein the partition between the anode compartment 2 and the center feed compartment 2 is a diaphragm 4 of controlled porosity. Between the cathode compartment 5 and the center feed compartment 3 there is a cation-permselective membrane 6 which prevents bulk mixing of the center and cathode compartment solutions. If desired, the cation permselective membrane can be replaced with a second controlled porosity diaphragm. The non-permselective porous diaphragm 4 is of a design which will allow passage of bulk electrolyte solution therethrough and being preferably of such suitable acid-resistant microporous materials as, for example, rubber, ceramic, polyethylene, polypropylene, Teflon and other synthetic fabrics.

The cation permselective membrane is in the form of a thin sheet substantially hydraulically impermeable to water and to ions carrying a negative charge but permeable to ions carrying a positive charge. The art contains many examples of cation exchange materials which can be formed into cation permselective membranes. Cation membrane 6 may be a self supporting reinforced carboxylic acid type membrane such as that described in U.S. Pat. No. 2,731,408 or preferably a sulfonic acid type membrane as disclosed in U.S. Pat. No. 2,731,411. A cation permselective membrane of high selectivity is desired because the production efficiency of caustic is largely determined by the degree to which negatively charged hydroxide ions are prevented from migrating through the membrane. For example, if the cation membrane is 80% selective to cations then one mol of hydroxide ions is transferred from the cathode compartment and lost into the center compartment for every five moles of hydroxide ions produced at the cathode.

The anode compartment 2 is provided with an acid resistant anode 7 (for example, lead, lead alloys of silver, antimony, tellurium and/or thallium, a tungsten bronze, platinum or platinum-coated electrolytic valve metals) which may be in the form of a sheet but is preferably perforated, expanded or in the form of a woven screen or closely spaced wires or rods, an outlet 8 for the anolyte liquid effluent product, outlet 9 for gaseous anodic products which may form such as oxygen and inlet 60 for passage of recycled anolyte therein. The center feed compartment contains an inlet 10 through which the electrolyte sulfate feed solution is introduced.

The cathode compartment 5 defined from the center compartment 3 by the cation membrane 6 is provided with an alkali-resistant cathode 11 (such as copper, lead or a lead alloy, nickel, iron or steel) which may be in the form of a sheet but is preferably in the form of an expanded sheet woven screen or closely spaced wires. The cathode chamber is also provided with an inlet 12 through which a make-up solution of either sodium sulfate, or water is introduced when found necessary, and an inlet 61 for introducing a carbonate, bicarbonate or electrolyte mixtures thereof which is recycled from the bottom of carbonation tower 40 as described in detail hereinafter. Water may also be added to the electrolyte mixture prior to entering inlet 61. Outlet 13 from the cathode compartment serves to withdraw the liquid catholyte product and outlet 14 removes gaseous cathodic products such as hydrogen. The diaphragm, membrane and electrode components may be separated from each other by thin gasketed spacers (not shown) which form the fluid-containing compartments of the cell.

In operation, a sulfate solution (for example, sodium sulfate, potassium sulfate, ammonium sulfate or magnesium sulfate) is introduced by pressure means (such as a pump) into the center compartment 3 through inlet 10 at a rate and pressure which in its passage through the porous diaphragm 4 (as shown by the arrow) is sufficient to substantially prevent fast-moving hydrogen ions formed at the anode from migrating to the cathode in competition with the passage of other cations into said cathode compartment from the center compartment. Simultaneously, a sulfate solution or makeup water is introduced into the cathode compartment via inlet 12 if so required. Under the influence of an impressed direct electric current, cations of the electrolytic solution in the center compartment pass through the cation permselective membrane 6 into the cathode compartment. The combination of such cations with hydroxide ions produced at the cathode by the electrolysis of water forms an alkaline solution. A sodium carbonate-bicarbonate solution, the source of which will be indicated hereinafter is introduced through inlet 61 into the cathode chamber. An alkaline sodium carbonate catholyte product which may also contain uncarbonated sodium hydroxide is withdrawn through outlet 13 in a concentration partially dependent upon the current employed and the rate of liquid makeup flow (such as water) into the cathode compartment.

The effluent alkali from cathode compartment 5 is passed via line 15 into a gas-liquid separation tank 16 where residual hydrogen gas is allowed to escape. Liquid effluent from tank 16 is withdrawn through line 18 and a portion introduced via line 84 into the upper area of a sulfur dioxide scrubber 19 by means of valve 81. Another portion is introduced into the upper area of carbonation tower 40 through line 27 by means of pump 26. Any remaining portion of the alkali liquid from tank 16 may be recycled through pump 24 back to the cathode compartment by way of recycle loop 20. Simultaneously therewith waste or flue gas containing the sulfur dioxide contaminant is passed into the bottom section of scrubber 19 through line 21, by means of a pump or gas blower 22. The scrubber may be of conventional design such as a countercurrent packed or spray chamber type and is preferably operated countercurrently so as to allow contacting the gas having the least amount of sulfur dioxide with the most avid absorbing liquid. The descending alkali solution will absorb acidic substances such as sulfur dioxide and then collect in the bottom of the absorber at 25. The residual gas exiting from the top of carbonation tower 40 is directed through line 28 to line 30 to join the residual gas passing up through valve 80 to be removed from the system through line 23. Of course if it is so desired the effluent scrubbed gas may optionally be passed through a liquid-gas separator 17 to remove entrained liquid droplets therefrom and then the substantially sulfur dioxide depleted gas is removed through line 23 to be discarded to the atmosphere. It is apparent that where a single pass of the flue gas is not sufficient to remove the desired percentage of sulfur dioxide, part of the gas may be recycled back to the bottom of the sulfur dioxide absorber tower 19 for further scrubbing. The substantially free sulfur dioxide waste gas leaving the top of scrubber is divided by a valve 80 allowing the desired amount of effluent gas to be directed through line 20 into an area near the bottom of carbonation tower 40, by means of pump 29.

The sulfate solution in the center compartment having now been partially depleted of its positive ions, passes through the porous diaphragm 4 into the anode compartment 2 where combination of the anionic sulfate groups and the anodically produced hydrogen ions forms an anolyte solution of the acid sulfate salt. This anolyte is withdrawn from the cell through outlet 8 and passed into the gas-liquid separation tank 36. The anolyte may be recycled back to the anode compartment through recirculation loop 37 by a pump 38 while a stream of anolyte solution is bled and removed from the acid holdup tank 36 for passage through line 39 into the neutralizer-stripper tank 35. Within this tank the laden alkali from bottom sump 25 of the sulfur dioxide scrubber 19 entering from line 31 will be neutralized by the acidic anolyte solution to form the orginal sulfate feed solution. The resulting regenerated sulfate solution is removed from the neutralizer-stripper tank 35 by line 42 and passed as a feed back to the cell preferably as an essentially neutral solution. During the neutralization reaction the absorbed sulfur dioxide is desorbed and recovered from tank 35 at exit line 44 as a substantially concentrated gas stream after first passing through a moisture-gas separator apparatus 45. The removal of the sulfur dioxide from the regenerated sulfate solution can be accelerated by use of a boiler or heater 46 to reboil and strip away the evolved sulfur dioxide gas. Other stripping means such as steam, vacuum, air or the like may also be employed in ways well known in the art. The regenerated sulfate solution is preferably passed through filter 47 or other particle removing means before being returned as a feed solution to the electrolytic cell in order to minimize blinding of the porous diaphragm of the cell. Additionally the sulfate solution may be concentrated by evaporation means (not shown) prior to passage into the center compartment.

FIG. 2 presents schematically the modification of the cyclic system of FIG. 1 wherein like numerals designate like parts. The modification in this drawing is directed to the absorber tower A which functions as a combination of the sulfur dioxide absorber and the carbonation tower. Absorber A is preferably of the well known countercurrent staged absorber type which includes several sections of baffles for liquid-gas contact and take-offs for liquid removals and need not structurally be further described in detail here. Tower A may also be a packed or bubble cap tower of the type previously described.

In FIG. 2, waste gas, which generally contains a small percentage of the $SO_2$ contaminant gas and a much greater percentage of carbon dioxide gas is directed by pressure pump 22 through line 21 into the bottom section of said staged absorber A where the gas rises in the tower to intimately contact the effluent catholyte solution entering through inlet lines 84 and 27. The sulfur dioxide contaminant of the influent waste gas will be absorbed in preference to the $CO_2$ gas by the downwardly flowing catholyte solution entering through inlet line 27 and the resulting spent solution is directed out of the bottom 83 of the absorber A as a sodium bisulfite solution to proceed to the stripper-neutralizer tank 35.

The substantially free $SO_2$ gas (containing high concentrations of $CO_2$) continues to rise in the absorber to make contact with fresh catholyte solution entering the top-most section of the absorber through line 84. This contact results in the carbonation of this catholyte solution to produce a liquid composition in the top-most section of the tower of mainly sodium bicarbonate. Thus when counter-current contact is accomplished by a tower containing a series of two or more stages, the carbonated recycle feed stream 32 to the cathode compartment of the electrolytic cell is preferably withdrawn from the top-most stage at effluent line 82, that is, the stage from which the scrubbed gas exits the tower. When the absorber tower is of the packed or bubble-cap type the catholyte feed stream enters at the top of the tower and flows downwardly. The recycle feed stream 32 to the cathode compartment is withdrawn from the upper (preferably the upper third) section of the tower where the liquid becomes rich in sodium carbonate. The presence of some $SO_2$ in this recycle cathode stream is not detrimental to the process. The remaining operation of the system of FIG. 2 for regeneration of a sodium sulfate feed solution to the center compartment and recovery of sulfur dioxide as a by-product is the same as that described for FIG. 1 and it would be redundant to repeat here.

For a better understanding of the operation of the electrolytic conversion system described above some basic general equations and their identity are indicated as follows:

Electrolytic conversion-catholyte system $$2Na^+ + 2H_2O + 2e = 2NaOH + H_2(g)$$

Carbonation reactions $$NaCO_3 + CO_2 + H_2O = 2NaHCO_3$$
$$NaOH + CO_2 = NaHCO_3$$
$$NaOH + NaHCO_3 = Na_2CO_3 + H_2O$$

Sulfur dioxide absorber $$Na_2CO_3 + 2SO_2 + H_2O = 2NaHSO_3 + CO_2$$

Stripper and neutralization $$2NaHSO_3 + 2NaHSO_4 = 2Na_2SO_4 + 2SO(g) + 2H_2O$$

Electrolytic conversion-anolyte system $$2Na_2SO_4 + H_2O = 2NaHSO_4 + 2Na^+ + 2e + \tfrac{1}{2}O_2(g)$$

The invention has been described in connection with a single three-compartment cell but it will be understood that for practical applications, a multiplicity of such three compartment cells preferably having common electrodes situated therebetween would be required.

The following examples show by further illustrations and not by way of limitation the cyclic method of removing sulfur dioxide from waste gases and the regeneration of the spent aqueous absorbent to form the original salt feed to the cell with improved attendant current efficiencies over the prior art due to the novel carbonation step.

EXAMPLE 1

This illustrates the use of a carbonation step to obtain increased current efficiency employing a carbonation tower as illustrated in the flow diagram of FIG. 1.

An electrolytic stack containing a plurality of twenty cells of the heretofore described three compartment cell is used to electrolytically convert an approximately one molar (2 normal) aqueous solution of sodium sulfate into its acidic and alkaline components. The cells all have lead alloy anodes containing 2% silver with 1% tellurium and nickel sheet cathodes. The diaphragms are microporous polypropylene and are physically supported on their anode facing side by polypropylene screen placed within the anode compartment. Screen material having a thickness of about two millimeters is similarly placed in the remaining compartments and essentially determines the spacing thickness of these compartments. The cation exchange membrane facing the catholyte compartments are the CR 70 carboxylic type prepared from a mixture of divinyl benzene, ethyl styrene and acrylic acid. The peripheral edges of the compartments are fitted with synthetic plastic gaskets having a compressed thickness equal to about the thickness of the compartments.

A sodium sulfate solution of about 0.95 mole is introduced into center compartments of the multicell stack at a flow rate of about 45 liters per hour (2.25 liters per cell). The voltage required is about 5.5 volts D.C. per cell and the temperature of the compartments is maintained at about 140° F. by recirculating both the anolyte and catholyte through heat exchangers. The current density at the anodes and cathodes is 120 amperes per square foot. At steady state a total of about 246 liters per hour of sodium carbonate solution is bled from the recirculating catholyte loop and is found to have a concentration of about 1.08 molar (264.5 gram-moles total) indicating a current efficiency of about 95%. A small portion of the catholyte bleed (about 20 liters per hour) is passed to the $SO_2$ absorber tower and the remaining large portion of the catholyte bleed (about 226 liters per hour) is passed into a separately disposed carbonation tower. The catholyte solution to the absorption tower is contacted counter-currently with a simulated flue gas containing about 0.3% by volume of $SO_2$. The contact is carried out in a column packed with polyethylene Raschig rings. The liquid and gas flows and the height of the packing are adjusted to remove about 90% of the $SO_2$ content of the flue gas and produce about 20 liters per hour of liquid effluent having a sodium bisulfite concentration of about 2.16 moles per liter. Simultaneously the anolyte solution is recirculated through the anode compartments of the electrolytic cell and constantly bled from the anolyte recirculating loop as a 1.08 molar solution of $NaHSO_4$ at a rate of about 39.5 liters per hour. This anolyte solution and the spent liquid effluent from the $SO_2$ absorber tower is combined and mixed together in the neutralizer-stripper tank to react and form a sodium sulfate solution. The $SO_2$ desorbed by the reaction is stripped from the resulting sodium sulfate solution and collected as a valuable product. The remaining a sodium sulfate solution is evaporated to a concentration of about 1.08 molar and returned as feed solution to the center compartments of the cell. The condensate from the evaporation step is collected and passed as a water make-up to the catholyte system as desired.

About 1.2% of the volume of the scrubbed gas evolving from the $SO_2$ absorption tower (substantially free of $SO_2$ but containing about 17% $CO_2$) is passed into the carbonation tower. Simultaneously the larger portion of the sodium carbonate solution removed as catholyte bleed is also passed into the carbonation tower counter-current to the flow of the $CO_2$ containing scrubbed flue gas. The carbonation step results in a liquid effluent comprising a sodium carbonate-bicarbonate solution to which about 17 liters per hour of make-up water is added thereto to produce a final volume of about 242 liters per hour and a concentration of about 0.92 molar in $Na_2CO_3$ and 0.16 molar in $NaHCO_3$. This carbonate-bicarbonate solution is passed as a feed stream to the cathode compartment to complete the catholyte loop system. The gas evolving from the carbonation tower is found to contain only about 5.8% $CO_2$ with the remaining volume being primarily nitrogen and some oxygen.

When the system is operated without the carbonation step approximately two normal sodium hydroxide is produced as the catholyte product to result in a loss of the carboxylic type cation membrane efficiency to about 90%. Thus the capacity of the $SO_2$ scrubber system is reduced accordingly.

EXAMPLE 2

The apparatus of Example 1 was operated with Ionics CR 61 sulfonated cation type membranes in place of the Ioncis CR 70 carboxylic type membranes employing the same general flow arrangement. At steady state a total of about 220 liters per hour of 1.08 molar solution of sodium carbonate (236 gram-moles total of $Na_2CO_3$) was produced as the catholyte effluent indicating a loss in current efficiency to about 85%. When the apparatus is operated without use of the carbonation step so that the catholyte product is primarily two normal sodium hydroxide, the current efficiency is radically reduced to about 67%. It is readily seen that the elimination of the carbonation step when employing the sulfonated cation type membrane results in a sharp loss in current efficiency.

EXAMPLE 3

Example 1 is repeated but employing a staged absorber as described in reference to FIG. 2 to function as a combined $SO_2$ absorber and carbonation tower. The operating conditions, solution concentrations, flow rates and results are similar to Example 1, the difference being that the $SO_2$ absorption and carbonation step occur in the single tower A. The total amount (246 liters per hour) of catholyte bleed solution from the catholyte recycle loop is passed as two separate streams 84, 27 into two separate sections of the absorber-carbonation tower. The larger stream 84 of about 226 liters per hour is passed to the uppermost area of the tower A which is located above the topmost plate and the smaller stream 27 of about 20 liters per hour is passed into a plate area located below the topmost plate. The $SO_2$ and $CO_2$ containing waste entering the tower at line 21 is passed upwardly through the tower where it first contacts the downwardly flowing smaller catholyte stream 27 resulting in a substantially $SO_2$ free gas and a spent catholyte effluent solution of sodium bisulfite. This scrubbed gas containing much $CO_2$ gas continues its upward flow to the upper section of the tower where it contacts the larger catholyte stream 84 resulting in the carbonation of said liquid stream. The carbonated stream is withdrawn from the top most plate at outlet 82 and passed as the catholyte recycle feed stream 32 to the cathode compartment. The remaining system which completes the cyclic process is operated in the same manner as Example 1.

EXAMPLE 4

Example 1 is repeated but operation is adjusted so that at steady state the 246 liters per hour of solution bled from the recirculating catholyte stream is found to have a concentration of about 0.91 molar in $Na_2CO_3$ and 0.32 molar in NaOH. About 20 liters per hour of this catholyte solution is passed through the absorber tower for scrubbing out the $SO_2$ content of the entering flue gas and the remaining volume directed into the separate carbonation tower. A portion of the substantially free $SO_2$ flue gas containing $CO_2$ is passed into the carbonation tower in contact with the downward flowing catholyte liquid. The carbonation step is controlled to effect carbonation ($2NaOH+CO_2=Na_2CO_3+H_2O$) of close to half the sodium hydroxide content of the said catholyte liquid. To the carbonate-hydroxide solution exiting from the bottom of the carbonation tower is added make up water sufficient to adjust the sodium hydroxide content to approximately 0.15 molar. This adjusted solution is recycled as the feed to the cathode compartment to complete the catholyte loop system. The presence of only a nominal amount (0.32 molar) of hydroxyl ions in the cathode compartment in contact with the cation membrane does not reduce the current efficiency to any substantial degree from that obtained in Example 1.

The embodiment of the invention in which an exclusive property or privilege is claimed are defined as follows:

1. A cyclic system for the continuous removal of sulfur dioxide from a gaseous waste mixture containing also carbon dioxide wherein a three compartment electrolytic cell is employed for converting aqueous alkaline metal salts into their corresponding acidic and alkaline solutions, the system characterized by:
    (a) influent means for feeding under pressure the said alkaline metal salt solution into the central compartment of said three compartment electrolytic cell containing an anode and cathode compartment, the central compartment being separated from the cathode compartment by a cation selective membrane and from the anode compartment by a porous diaphragm thus causing said salt solution to pass through said porous diaphragm into the anode compartment;
    (b) liquid effluent means for separately removing said acid anolyte and alkaline catholyte solutions from the anode and cathode compartments respectively, of said cell,
    (c) scrubber means for intimately contacting said waste gases with a first portion of said catholyte solution causing a major proportion of said catholyte solution to be converted to bisulfite and resulting in a substantially $SO_2$ free scrubbed gas,
    (d) means for contacting the substantially $SO_2$ free gas containing $CO_2$ with a second portion of said catholyte solution to result in at least a partial carbonation of said solution,
    (e) means for passing said carbonated solution back to the cathode area of said cell,
    (f) means for combining the said bisulfite solution with said anolyte solution resulting in a neutralization reaction and the desorption and release of sulfur dioxide gas therefrom,
    (g) means for recovering said released sulfur dioxide gas, and
    (h) means for returning at least a portion of the neutralized solution as a feed solution back to said electrolytic cell, thus completing the cyclic system.

2. The cyclic system according to claim 1 which is provided with a multiplicity of said electrolytic cells.

3. The cyclic system according to claim 1 wherein means is provided for concentrating said neutralized removed solution as the returned feed solution to said electrolytic cell.

4. The cyclic system according to claim 1 wherein the cation selective membrane separating the cathode compartment from the central compartment is of the type selected from the class containing sulfonated and carboxylic ion-exchange groups.

References Cited

UNITED STATES PATENTS

| | | | |
|---|---|---|---|
| 2,768,945 | 10/1956 | Shapiro | 204—72 |
| 3,135,673 | 6/1964 | Tirrell et al. | 204—98 |
| 3,165,460 | 1/1965 | Zang et al. | 204—301 |
| 3,222,267 | 12/1965 | Tirrell et al. | 204—98 |
| 3,344,050 | 9/1967 | Mayland et al. | 204—98 |
| 3,433,726 | 3/1969 | Parsi et al. | 204—180 |

JOHN H. MACK, Primary Examiner

A. C. PRESCOTT, Assistant Examiner